G. W. WATSON.
CHILD'S VEHICLE.
APPLICATION FILED SEPT. 12, 1918.

1,341,768.

Patented June 1, 1920.

Inventor:
George W. Watson
By his attorney
Charles N. Gooding.

UNITED STATES PATENT OFFICE.

GEORGE W. WATSON, OF BOSTON, MASSACHUSETTS.

CHILD'S VEHICLE.

1,341,768.     Specification of Letters Patent.     Patented June 1, 1920.

Application filed September 12, 1918. Serial No. 253,830.

*To all whom it may concern:*

Be it known that I, GEORGE W. WATSON, a citizen of the United States, residing at Boston, in the county of Suffolk and State of Massachusetts, have invented new and useful Improvements in Children's Vehicles, of which the following is a specification.

This invention relates to a child's vehicle, the object of the invention being to provide a child's vehicle which can be propelled and steered by the child alone, which is comfortable and which is constructed to yield to the different motions of the body when being propelled by the child, the preferred way of operating the vehicle being for the child to sit somewhat sidewise upon the seat with one foot touching the ground from time to time and thus propelling the vehicle, all as more specifically hereinafter described.

The invention consists in the combination and arrangement of parts set forth in the following specification and particularly pointed out in the claims thereof.

Referring to the drawings.

Like numerals refer to like parts throughout the several views of the drawings.

Figure 1:
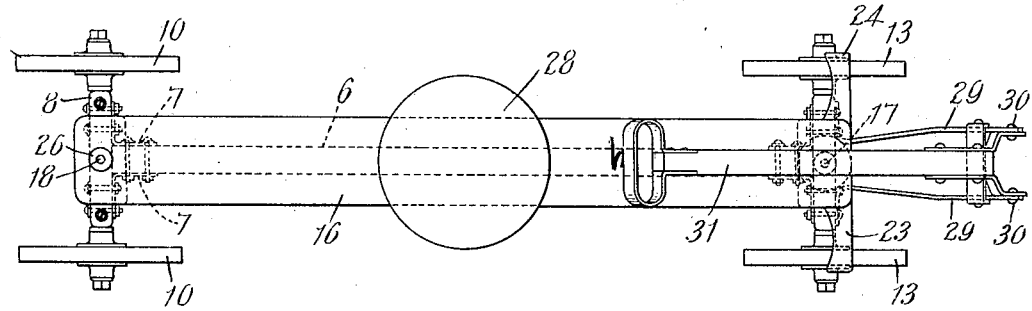
Figure 1 is a plan view of my improved child's vehicle.
Figure 2:
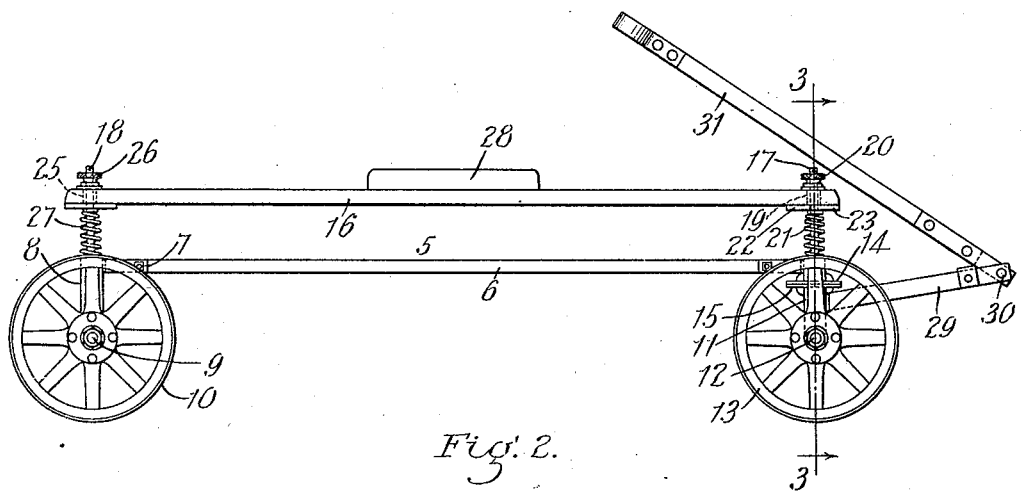
Fig. 2 is a side elevation of the same.
Figure 3:
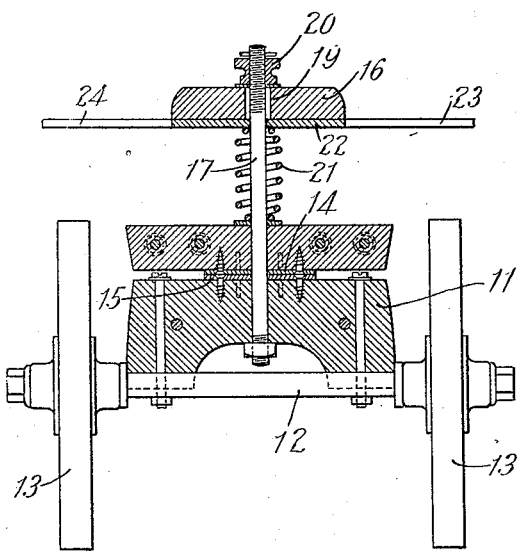
Fig. 3 is an enlarged section taken on line 3—3 of Fig. 2.

In the drawings, 5 is the body of the vehicle consisting of a board 6 extending longitudinally of the vehicle and being fastened at its rear end by brackets 7 to a bolster 8, the bolster 8, in its turn, being fastened to a rear axle 9 upon which wheels 10 are rotatably mounted.

The front end of the vehicle has a bolster 11 fastened to the front axle 12 and upon said front axle wheels 13 are rotatably mounted. The front end of the board 6 has a journal plate 14 fast to its under side and mounted to rotate upon a journal plate 15 fast to the front bolster 11.

A seat 16 extends longitudinally of the vehicle and terminates at its opposite ends above the front and rear axles. This seat consists of a comparatively narrow board and is connected to the front and rear bolsters by bolts 17 and 18 respectively. The bolt 17 extends through the front bolster and upwardly therefrom through the journal plates 14 and 15 through the front end of the board 6 and through a hole 19 in the front end of the seat 16, this hole 19 being of considerably larger diameter than the diameter of the bolt 17 so that the seat 16 can be tipped thereon to a limited extent.

A nut 20 has screw-threaded engagement with the upper end of the bolt 17 and interposed between the seat 16 and the board 6 is a spring 21. Thus it will be seen that the front end of the seat can be moved upwardly and downwardly and also tipped laterally upon the bolt 17.

A cross-piece 22, constituting a support for the feet of the rider when the vehicle is used in coasting, is fastened to the front end of the seat and preferably underneath the same and projects laterally therebeyond forming foot pieces 23 and 24 upon which the user can place his feet to steady himself upon the seat when coasting.

The bolt 18 extends upwardly from the bolster 8 through a hole 25 in the rear end of the seat 16, the diameter of said hole being larger than the diameter of the bolt 18.

A nut 26 has screw-threaded engagement with the upper end of the bolt 18 and a spring 27 is interposed between the seat 16 and the rear bolster, whereby the seat 16 may be moved upwardly or downwardly and also tipped laterally.

An auxiliary seat 28, preferably cylindrical in form, is fastened to the main seat 16.

A pair of brackets 29 are fastened to the front bolster 11 and pivoted to said brackets at 30 is a handle 31, whereby the vehicle can be pulled or steered, as the case may be.

In using the device it is desirable, although not essential, that the rider should sit in a somewhat sidewise position with both legs projecting downwardly upon the same side of the seat 16 and with one leg in position so that the foot can touch the ground and be used to propel the vehicle.

The user takes hold of the handle 31 and by moving the same in one direction or another he can, through the brackets 29, cause the bolster 11 to be moved in opposite directions and said bolster, together with the journal plate 15, will thus be caused to rotate upon the journal plate 14 and guide the vehicle in any desired direction. While propelling the vehicle in the manner hereinbefore described the weight of the rider will cause the springs 21 and 27 to be more or less compressed and as the rider reaches down with his foot to push against the ground, the seat 16, together with the auxiliary seat 28, will accommodate itself both as to its vertical position and as to its position laterally with relation to the vehicle to the most convenient and comfortable position for the body of the user resting thereon.

Having thus described my invention, what I claim and desire by Letters Patent to secure is:

1. A child's vehicle having, in combination, a front axle, a rear axle, wheels mounted upon said axles, a body consisting of a rear bolster fastened to said rear axle, another bolster fastened to said front axle, a board extending longitudinally of said vehicle and rigidly fastened to said rear bolster, said front bolster being rotatably mounted on said board, a seat extending longitudinally of said vehicle and terminating at its opposite ends above said front and rear bolsters, a bolt extending from said front bolster through said seat, another bolt extending from said rear bolster through said seat and springs encircling each of said bolts and interposed between said seat and board, whereby a combined vertical and lateral movement may be imparted to said seat.

2. A child's vehicle having, in combination, a front axle, a rear axle, wheels mounted upon said axles, a body consisting of a rear bolster fastened to said rear axle, another bolster fastened to said front axle, a board extending longitudinally of said vehicle and rigidly fastened to said rear bolster, said front bolster being rotatably mounted on said board, a seat extending longitudinally of said vehicle and terminating at its opposite ends above said front and rear bolsters, a bolt extending from said front bolster through said seat, another bolt extending from said rear bolster through said seat, springs encircling each of said bolts, and interposed between said seat and board, whereby a combined vertical and lateral movement may be imparted to said seat, and means to adjust the tension on said springs.

3. A child's vehicle having, in combination, a front axle, a rear axle, wheels mounted upon said axles, a body consisting of a rear bolster fastened to said rear axle, another bolster fastened to said front axle, a board extending longitudinally of said vehicle and rigidly fastened to said rear bolster, said front bolster being rotatably mounted on said board, brackets fast to said front bolster and projecting forwardly therefrom, a handle pivotally mounted between said brackets whereby said vehicle may be steered, a seat extending longitudinally of said vehicle and terminating at its opposite ends above said front and rear bolsters, a bolt extending from said front bolster through said seat, another bolt extending from said rear bolster through said seat and springs encircling each of said bolts and interposed between said seat and board, whereby a combined vertical and lateral movement may be imparted to said seat.

In testimony whereof I have hereunto set my hand in presence of two subscribing witnesses.

GEORGE W. WATSON.

Witnesses:
FRANKLIN E. LOW,
ANNIE J. DAILEY.